W. T. YOUNG.
AXLE CONSTRUCTION FOR CAR TRUCKS.
APPLICATION FILED NOV. 11, 1909.

962,398.

Patented June 21, 1910.

2 SHEETS—SHEET 1.

Witnesses
Charles J. Nelson
G. Sargent Elliott

Inventor:
William T. Young
By H. S. Bailey, Attorney.

W. T. YOUNG.
AXLE CONSTRUCTION FOR CAR TRUCKS.
APPLICATION FILED NOV. 11, 1909.
962,398.
Patented June 21, 1910.
2 SHEETS—SHEET 2.
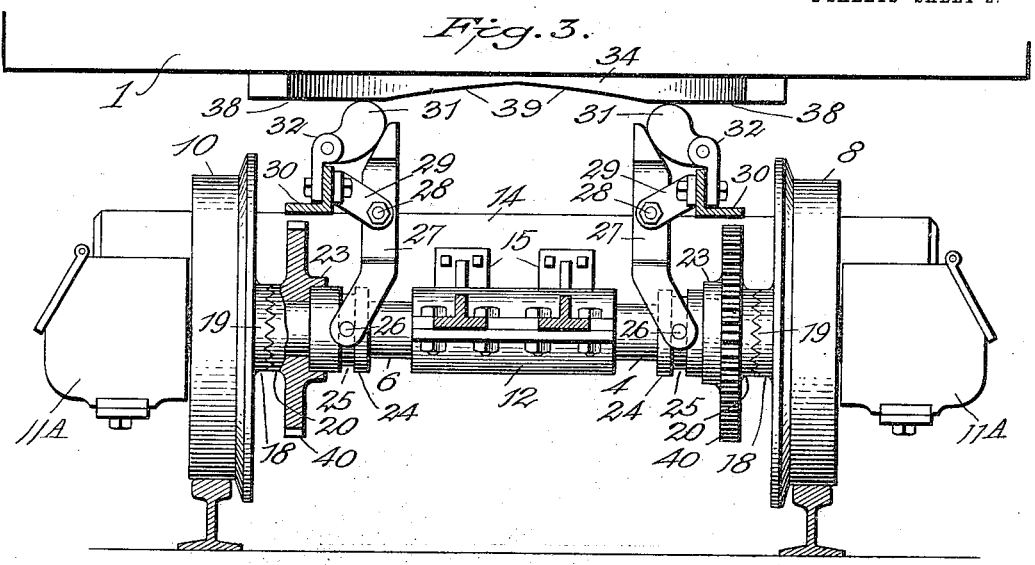
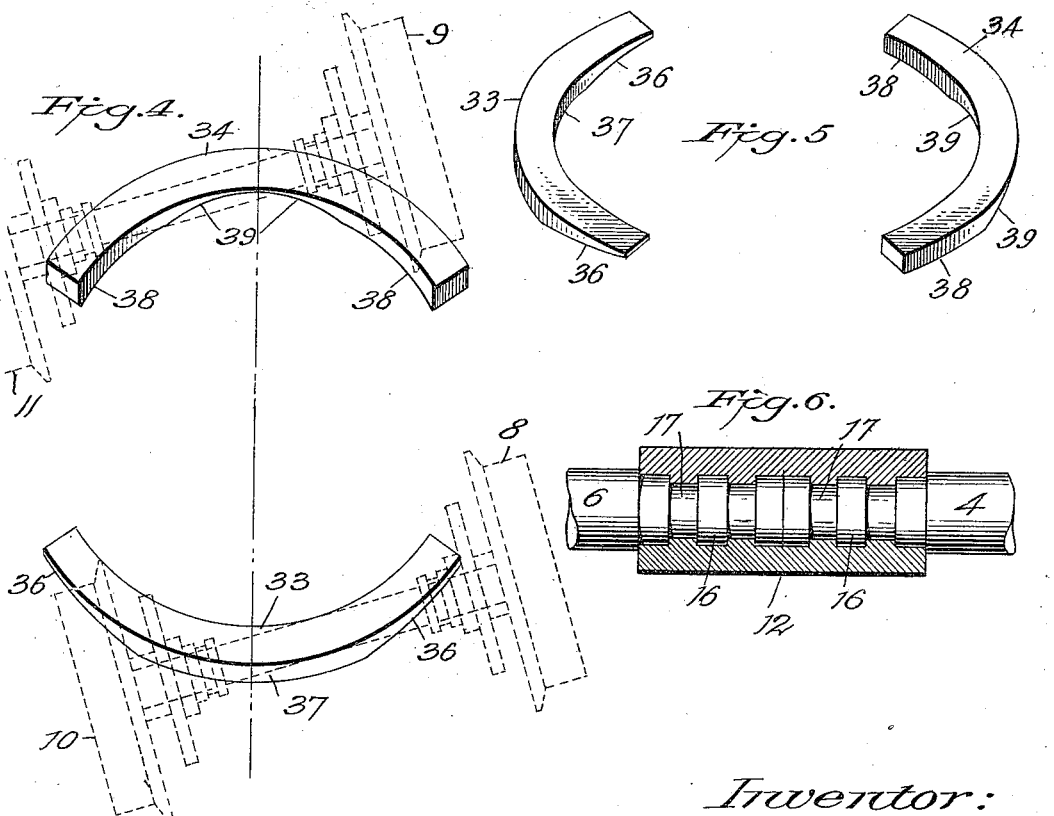
Witnesses:
Charles J. Nelson
G. Sargent Elliott
Inventor:
William T. Young.
By H. S. Bailey  Attorney.

UNITED STATES PATENT OFFICE.

WILLIAM T. YOUNG, OF DENVER, COLORADO, ASSIGNOR OF ONE-HALF TO CHARLES J. NELSON, OF DENVER, COLORADO.

AXLE CONSTRUCTION FOR CAR-TRUCKS.

962,398.

Specification of Letters Patent. Patented June 21, 1910.

Application filed November 11, 1909. Serial No. 527,500.

*To all whom it may concern:*

Be it known that I, WILLIAM T. YOUNG, a citizen of the United States of America, residing at the city and county of Denver and State of Colorado, have invented a new and useful Axle Construction for Car-Trucks, of which the following is a specification.

My invention relates to improvements in axle construction for railway trucks, and the objects of my invention are: First, to provide an independent axle for each car-wheel for the truck, that shall be in alinement with the opposite axle and car wheel of the truck, and that will permit independent rotative movement of each car wheel and its axle when rounding curves. Second, to provide an independent divided axle and clutch driving and releasing mechanism for electric motor driven cars that permits the wheels on one side of the truck to rotate independently of those on the opposite side when rounding curves. I attain these objects by the mechanism illustrated in the accompanying drawings, in which—

Figure 1:
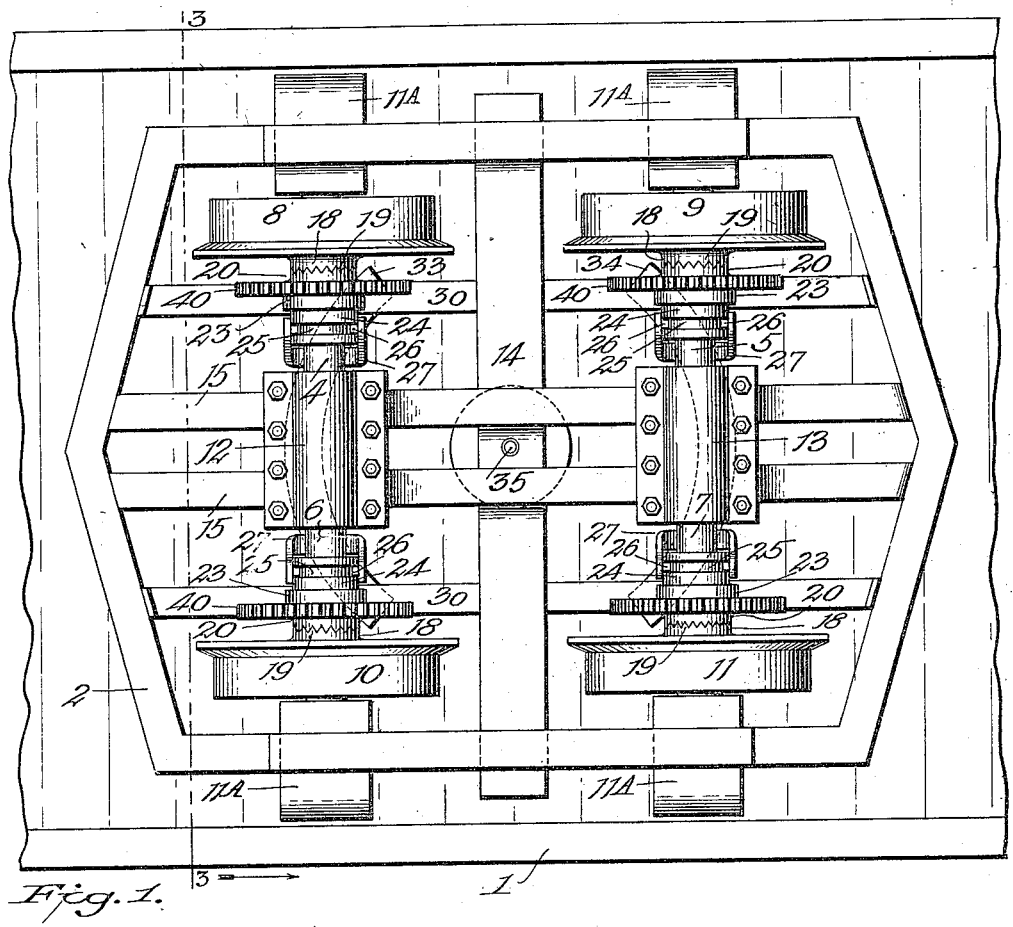
Figure 2:
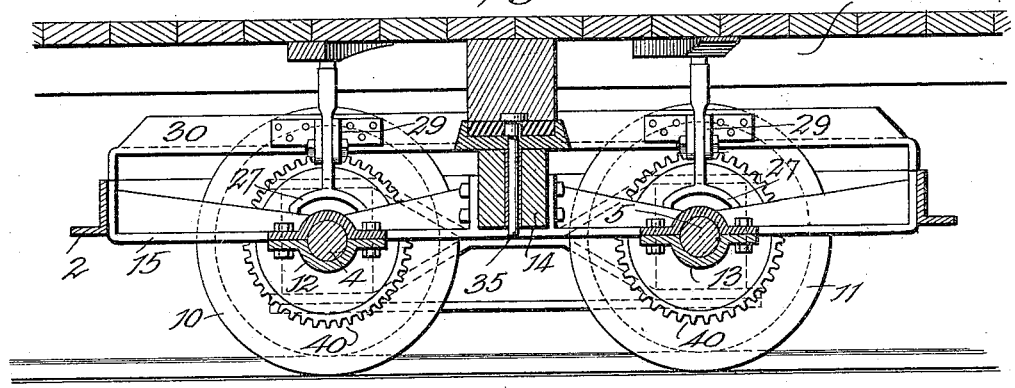

Figure 1 is a bottom plan view of a car truck embodying my improved axle construction. Fig. 2 is a central, longitudinal, sectional view of the same. Fig. 3 is a transverse, sectional view on the line 3—3 of Fig. 1, looking in the direction of the arrow. Fig. 4 is a perspective, plan view of the two cam plates, by which the clutch mechanism connected with the car wheels is operated, the wheels and axles being shown in dotted lines, and turned at an angle relatively to said plates. Fig. 5 is a perspective view of the cam plates, looking from one side; and Fig. 6 is a sectional view through the supporting box for the abutting ends of the divided axle.

Similar letters of reference refer to similar parts throughout the several views.

Referring to the drawings, the numeral 1 designates the lower portion of a railway car, which may be either a passenger or freight car, and 2 designates a truck frame. The truck frames at each end of the car are similar in construction and arrangement to the truck frames in common use, or they may be of any suitable construction to support the axles and their track running car wheels that are journaled to them.

My invention has for its essential object the production of a car truck, each wheel of which is journaled independently of the others, in order that the wheels on either side of the truck may rotate faster or slower than the others in rounding curves. To accomplish this object, I provide each car wheel with an independent axle, and consequently employ four axles, 4, 5, 6 and 7, and the four track wheels, 8, 9, 10 and 11, are secured to their respective axles by any suitable means, but preferably being pressed thereon by hydraulic pressure. Each axle extends from its journal box 11ᴬ in the side of the truck frame to the center of the width of the track, and the inner terminal ends of each adjacent pair of axles are journaled in axial alinement with each other across the truck and with their ends abutting against or positioned close to each other within the journal boxes 12 and 13. These journal boxes are secured in a fixed position to the central cross beam 14 of the truck by longitudinal supporting beams or brackets 15. Each pair of axles are thus rotatably journaled at their inner ends in a firmly supported journal box of sufficient length and strength to enable them to withstand all of the strains of a single integral shaft extending across the truck.

The inner journaled ends of the axles are each provided with a plurality of collar and neck portions 16 and 17 respectively, which are babbitted on or otherwise fitted into similar collar and neck portions formed in the journal boxes, and they prevent excessive end movement of the axles. The outer ends of these four axles are journaled in the boxes 11ᴬ of the frame in the usual manner.

Upon the inside of each wheel a hub portion 18 is formed, the end surface of which is provided with radial clutch teeth 19, and upon each axle adjacent to the clutch surface of each wheel I mount a sliding clutch 20. This clutch comprises a hub portion, the end of which that is opposite to the clutch surface of the wheels is provided with clutch teeth adapted to register with the clutch teeth of the wheels. This hub shaped clutch is mounted loosely on each axle, and it is also provided with a recessed end portion 23, which forms a frictional end bearing and slipping surface for a sliding sleeve 24, the end of which that lies opposite to the frictional surface end of the clutch hub is also adapted to register against and form a frictional bearing surface against the adjacent end of the clutch hub. The sleeve is also provided with a circumferential groove or recessed neck portion 25, in which oppositely arranged pins 26 project from the opposite free ends of the yoke shaped end of a lever 27, which is pivotally supported by a bolt 28 intermediately of its ends to a pair of eared lugs 29, which are secured to a bar or beam 30, that is secured to the truck.

The yoke portions of the levers 27 surround the inner ends of the sleeves 24, and the pins 26 in their free ends project loosely into the circumferential grooves 25, while the opposite end of the lever 27 extends above the bar 30 and is engaged by the surface of a cam 31, which is pivotally secured at its upper end to a pair of ears 32, which are secured to the upper side of the bar 30.

The cams 31 of each divided axle are adapted to engage cam plates, by which they are held against the upper ends of the levers 27, when the car is going in a straight or substantially straight line, whereby the sliding clutches 20 are held in engagement with the wheel clutches 19 of the wheels, but these plates are so arranged that when the car is rounding a curve the two inner wheels of each truck are engaged by the clutches 20, while the two outer wheels are disengaged from their clutches 20 and are free to move independently of the inner wheels, and at a different rate of speed.

The cam plates 33 and 34 are arranged as shown in Figs. 4 and 5, the plate 33 of each truck being the inner plate or the one nearest the longitudinal center of the car, while the plate 34 of each truck is the outer plate or the one nearest the adjacent end of the car. The plates are each curved to conform to the arc described by the cams 31 as the truck turns upon its pivot bolt 35, and they are formed as follows: Each plate 33 has its ends beveled or inclined for a suitable distance, as shown at 36, and the remaining portion 37 of the plate or the portion between the inclined ends, is on a horizontal plane. The ends of each plate 34 have a straight or horizontal surface 38 on the same plane as the portion 37 of the plate 33, and these straight or horizontal portions 38 extend back a distance equal in length to the inclined portions of the other plate, from which points the surface of the plate inclines upward to a point midway between its two ends, as shown at 39. Thus, when the track extends in a straight or substantially straight line the cams controlling the forward wheels 9 and 11 are engaged by the portion 38 of the plate 34, and those controlling the wheels 8 and 10 are engaged by the portion 37 of the plate 33, and the levers 27 are thereby operated to hold the sliding clutches 20 in engagement with the wheel clutches 19, and the wheels are all running in unison. But when the car strikes a curve the trucks turn on their pivot bolts, as indicated in Fig. 4, and the cams operating the clutches of the outer wheels 8 and 9 slide on to the inclined portions 36 and 39 respectively of the plates 33 and 34 respectively, and the pressure on the sleeves 24 is thereby released and the adjacent clutches are disengaged from the wheels; as the natural tendency of the clutch teeth 19 on the hub 18, is to throw the clutch 20 out of engagement with the said clutch teeth 19 as soon as the pressure on the sleeve 24 is released. At the same time the cams controlling the clutches of the wheels 10 and 11 are engaged by the surfaces 37 and 38 respectively, and the said wheels 10 and 11 are locked to their operating clutches. The same result is accomplished when an opposite curve is reached, and the wheels 10 and 11 become the outside wheels.

Upon the circumferential surface of each clutch hub a gear wheel 40 is secured, which meshes with the driving gear of a set of electric motors, which may comprise a pair of motors having a driving shaft extending through and beyond each end of them, or a set of four independent motors. These electric motors may be mounted in any suitable manner on the truck. I do not illustrate these motors and their driving gears, however, as they do not form an essential part of my invention.

The operation of my automatic compensating movement curve traveling axles and truck is as follows: The cams and the cam plates are so relatively arranged to each other that when the trucks are running on a straight track the cams bear on the horizontal faces of the cam plates and the four clutches are all locked to the car wheels and are being driven by the motors; but when the trucks strike a curve they turn on their pivots and draw the cam lugs of the two outer wheels down the inclined plane of their respective cam plates far enough to permit the sleeve to work away from the clutch hub and thus allow the adjacent clutch hub's clutch surface to work away from the clutch surface of the car wheels and release these wheels from the sliding clutch mechanism and allow them to run around the longer track surface of the curve independent of the car wheels on the shorter radius of the curve which have a shorter track surface to travel and which are still coupled to the clutches on that side of the truck and are driven by the motors. Consequently, in rounding curves the wheels on one side of the truck when the cars are electrically operated are always in mesh with the driving motors, while those on the opposite side of the truck are out of mesh with them.

My invention contemplates the use of my independent axles on steam locomotive drawn cars, and when used on them the clutch mechanism may be dispensed with and the independent axles used, which allows all of the car wheels and their axles to rotate independently of the others.

My invention provides a simple and practical method of preventing the flat wearing and the slipping of car wheels when rounding curves.

Having described my invention, what I claim as new and desire to secure by Letters Patent is:

1. In an independent rotating axle mechanism for each car wheel of railway cars, the combination with the car and the truck, said truck being provided with car wheels, each car wheel being provided with an independent axle of its own, and each car wheel and its axle being independently journaled in said truck in transverse alinement of the truck, a clutch surface on the inside of each car wheel, a sliding clutch on each axle, a lever extending from said clutch, a cam lug arranged to engage said lever, and means including a cam plate secured to the bottom of said car and arranged in the path of said truck and of the cam lug for moving said sliding clutch automatically to engage the car wheels of said truck when said wheels are running on a straight track, and to permit the clutches of the outside wheels to become disconnected from said wheels when the car strikes a curve.

2. In a device as specified, the combination with a car and truck, of divided axles on said truck, boxes which receive the inner ends of said divided axles, wheels on the separate axles having clutch hubs, sliding clutches on the separate axles adapted to engage the clutch hubs; levers for sliding said clutches, and means engaging said levers whereby the clutches of the outer wheels are released, and those of the inner wheels are held in engagement therewith, when the car is rounding a curve, and gears on the sliding clutches adapted to be connected with a source of power.

3. In a device as specified, the combination with a car and truck of divided axles on said truck and bearings for the outer and inner ends of said axles, wheels on the parts of said divided axles having clutches formed on their hubs, sliding clutches on said axles adapted to engage the hubs, operating levers for sliding said clutches, gears on said clutches adapted to connect with a source of power, pivoted cams engaging the ends of said levers, and cam plates concentric with the arc described by the cams when the truck turns on its pivot, having faces which hold said cams in engagement with the levers on a straight track, and other faces which permit said cams to release the levers in pairs relatively to the direction of a curved portion of the track.

4. In a device as specified, the combination with a car and truck, of a divided axle on said truck, bearings for the outer end of said axle and a bearing for the abutting ends thereof, wheels on said axle having clutches formed on their hubs, sliding clutches on said axle adapted to engage said hub clutches, operating levers for sliding said clutches, pivoted cams in engagement with clutches, pivoted cams in engagement with the levers, and a cam plate on the car having faces which engage said cams when the truck is parallel with the car and hold them against the levers, and other faces which permit one or the other of said cams to release its lever when the car strikes a curve, and means for connecting the sliding clutches with a source of power.

5. In a device as specified, the combination with a car and truck, of divided axles mounted on said truck, wheels on the separate axles having clutch faces on their hubs, sliding clutches on the axles adapted to engage the said clutch faces on the hubs, levers for sliding said clutches, cams adapted to operate said levers to lock the clutches, curved cam plates secured to the bottom of the car having faces adapted to engage and hold the cams in a locked position relatively to the wheels when the car is running on a straight track and other faces which permit the cams to release the clutches or controlling the two outside wheels when the car is rounding a curve, and gear wheels on the sliding clutches adapted to connect with a source of power.

6. In a device as specified, the combination with a car and truck, divided axles on said truck, wheels on the separate axles having hubs with clutch faces thereon, sliding clutches on said axles adapted to engage said hubs, means for connecting the sliding clutches with a source of power, levers for said sliding clutches and pivoted cams in engagement with the levers, of curved cam plates on said car having engaging faces for said cams whereby they are all held against said levers when the truck is parallel with the car, or each inner pair are held and each outer pair permitted to be released when the car is rounding a curve.

7. In a device as specified, the combination with a car and truck, divided axles mounted on the truck, wheels on the axles having clutch hubs, sliding clutches on the axles adapted to engage the said clutch hubs, gear wheels on the said clutches adapted to connect with a source of power, levers for sliding said clutches, of cam plates on the car for operating said levers whereby they are held to lock all of the clutches when the car is going in a straight direction or permitted to release the two outside clutches when the car is rounding a curve.

8. The combination with a car, a truck, a divided axle mounted on the truck, wheels on said axle, sliding clutches on said axle adapted to engage the hub of said wheel, gear wheels on the sliding clutches adapted to be connected with a source of power, levers for operating said clutches, of means secured to the bottom of the car for holding the levers to lock the clutches when the car is traveling in a straight line, or to permit one or the other of the clutches to be released when the car is rounding a curve.

9. In a device as specified, the combination with a car, a truck pivotally mounted thereon, divided axles mounted on said truck, wheels on said axles, the hubs of which are provided with clutch teeth, sliding clutches on the axles adapted to engage the clutch hubs, gear wheels on said sliding clutches adapted to be connected with suitable motors, sleeves on said axles adapted to have frictional engagement with the ends of the sliding clutches, yoke levers having pins which lie in circumferential grooves in said sleeves, pivoted cams in engagement with the free ends of said levers, and cam plates on the car concentric with the arc described by said cams having faces which engage the cams to hold the clutches in a locked position when the car is traveling in a straight direction, and permit the release of the outside pair of cams when the car is rounding a curve.

10. In a device as specified, the combination with the car, the truck thereon, the divided axles mounted on the truck, wheels on the axles having clutch faced hubs, sliding clutches on the axles for engaging the clutch faced hubs, gear wheels on the axles adapted to be connected with suitable motors, yoke levers for moving said sliding clutches, and pivoted cams in engagement with the free ends of the yoke levers, of oppositely curved cam plates on said car, above the axles, which engage the said cams, one of said plates having beveled or inclined ends which terminate in a horizontal face, while the ends of the opposite plate have faces on a horizontal plane which terminate in upwardly inclined faces.

In testimony whereof I affix my signature in presence of two witnesses.

WILLIAM T. YOUNG.

Witnesses:
CHARLES J. NELSON,
G. SARGENT ELLIOTT.